No. 633,229. Patented Sept. 19, 1899.
O. P. CLARK.
FISH TRAP.
(Application filed Nov. 19, 1898.)
(No Model.)
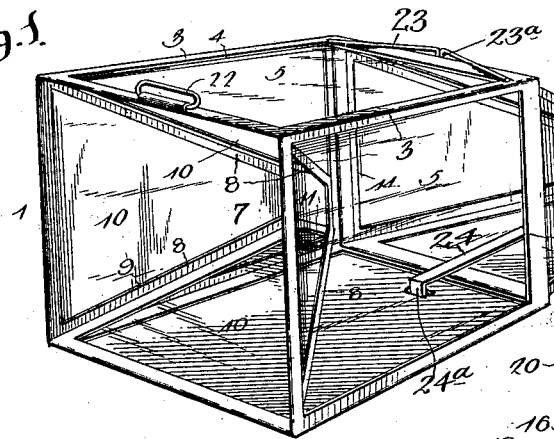
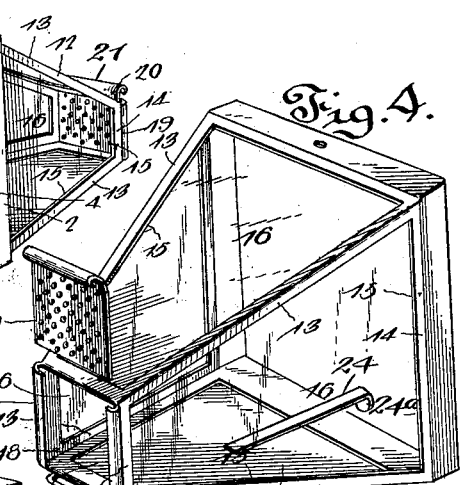
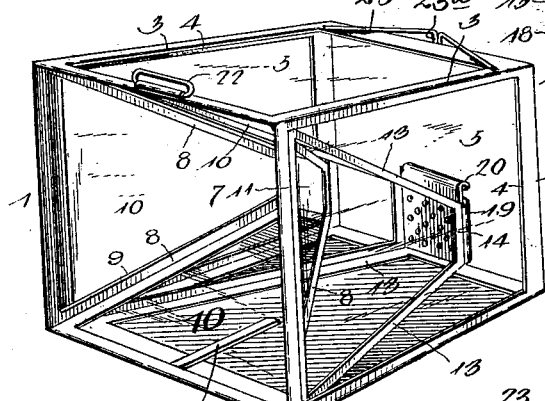
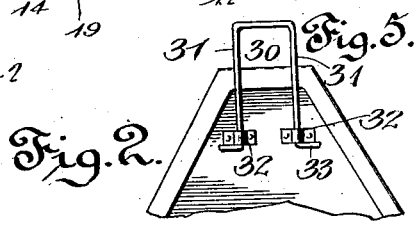
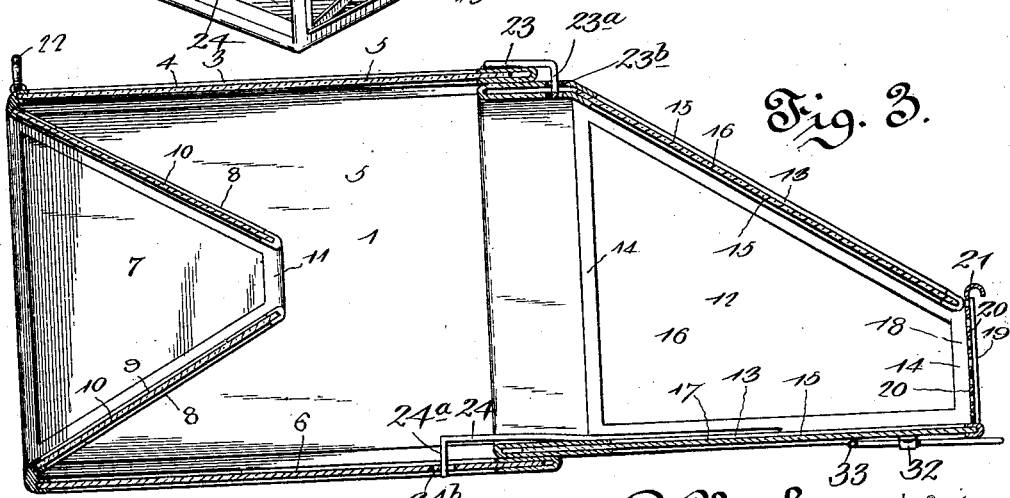
O. P. Clark, Inventor.
Witnesses
By his Attorneys,

UNITED STATES PATENT OFFICE.

OSCAR P. CLARK, OF BENTONVILLE, ARKANSAS.

FISH-TRAP.

SPECIFICATION forming part of Letters Patent No. 633,229, dated September 19, 1899.

Application filed November 19, 1898. Serial No. 696,872. (No model.)

*To all whom it may concern:*

Be it known that I, OSCAR P. CLARK, a citizen of the United States, residing at Bentonville, in the county of Benton and State of Arkansas, have invented a new and useful Fish-Trap, of which the following is a specification.

This invention relates to fish-traps; and it has for its object to provide an improved construction of trap of this character especially designed for catching minnows or other fish for bait, although the same is capable of general application as a trap for fish or amphibious animals.

To this end the invention primarily contemplates a simple construction of transparent trap having means for facilitating the decoying and imprisonment of minnows in large quantities, while at the same time providing for the constant circulation of water therethrough and the convenient removal of the fish from the trap.

A further object of the invention is to construct the trap in sections capable of being telescoped or nested together, whereby the trap will occupy an exceedingly small compass when the same is not in use or being transported in quantities.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a fish-trap constructed in accordance with the present invention. Fig. 2 is a similar view showing the detachable hood-extension of the trap nested within the box-body thereof. Fig. 3 is a longitudinal sectional view of the complete trap, showing the parts thereof assembled for use. Fig. 4 is a detail in perspective of the detachable hood of the trap. Fig. 5 is a detail bottom plan view of the portion of the detachable hood, showing the handle attachment therefor.

Referring to the accompanying drawings, the numeral 1 designates the rectangular transparent box-body of the trap, essentially consisting of a skeleton framework of upright and horizontal metal strips 2 and 3, respectively, joined together at their contiguous extremities and having grooved inner edges 4, adapted to have securely fitted therein the edges of the inclosing panels. The inclosing panels 5, which are fitted in the opposite sides and top of the skeleton framework 1, are preferably ordinary glass plates, but of course may be made of transparent celluloid or other equivalent material; but in order to protect the trap from breakage on the rocky bottom of a stream the bottom panel 6 of the box-body, which is fitted within the bottom part of the skeleton framework, is preferably a plate of galvanized metal. By reason of the skeleton structure of the metal framework 1 in the event of a glass panel 5 breaking the same can be readily replaced by a new panel at a trifling expense without affecting the remainder of the trap.

From the foregoing it will be seen that the box-body 1 of the trap is entirely transparent, except at the bottom, which of course necessarily rests on the bottom of the stream in which the trap is used, and in the present invention the box-body has projected inwardly from one end thereof a frusto-pyramidal entrance-funnel 7. The entrance-funnel 7 by reason of its pyramidal shape is necessarily rectangular in cross-section, and also essentially consists of a skeleton framework of inwardly-convergent metal strips 8, joined together at their contiguous extremities and also to the framework 1 of the box-body at one end of the latter, and the said strips 8, of the entrance-funnel are also provided at their edges with grooves 9 for receiving the edges of the transparent inclosing panels 10 of the funnel. The panels 10 inclose the spaces between the converging strips 8, and therefore form the inclosing sides of the funnel, and by reason of said panels 10 of the funnel, as well as the panels 5 of the box 1, being transparent there is nothing to obstruct a free view of the interior of the trap and contents thereof.

At its apex within the box-body the entrance-funnel 7 is provided with an opening 11, disposed centrally between the inclosing sides or panels of the box-body and permitting the fish to readily pass into the interior of the trap, while at the same time by reason of its location will not afford a ready escape for the fish in view of the well-known habit of fish swimming along or hugging the walls of a trap or receptacle, especially when of a transparent nature. The fish which enter through the entrance-funnel 7 not only pass into the box-body 1, but are free to swim into the detachable pyramidal hood 12 of the trap. The pyramidal hood 12 is also in the form of a frustum of a hollow pyramid, but when in use projects beyond the end of the box-body opposite the end into which projects the entrance-funnel, thereby materially increasing the interior area of the trap, while at the same time permitting a ready access thereto.

The extended detachable pyramidal hood 12, like the entrance-funnel 7, essentially consists of a skeleton framework of convergent metal strips 13, which are joined at their opposite ends to rectangular frame portions 14, which, together with the convergent strips 13, complete the entire frame of the hood. The said metal strips 13 and frame portions 14 are provided at their inner edges with grooves 15 for receiving the edges of the inclosing panels of the hood, and the inclosing panels 16, which are fitted in the opposite sides and top of the skeleton framework, are preferably glass plates, so that the hood as well as the body of the trap, will be entirely transparent, except at the bottom, and the bottom of said hood is inclosed by a galvanized-metal bottom panel 17, which is fitted within the bottom part of the skeleton framework for the hood.

At its small end or apex the detachable pyramidal hood 12 is provided with an outlet-opening 18 for the fish, at the side edges of which opening are formed the oppositely-located parallel guide-flanges 19, receiving the side edges of the sliding perforate gate 20, which normally covers the opening 18 and prevents the escape of the fish, while at the same time permitting of a circulation of water through the trap. Said sliding perforate gate 20 is preferably provided at its upper edge with the outturned finger-flange 21, which affords a grip for the fingers, so that the gate may be readily opened and closed.

To facilitate lifting up and handling the entire trap, the box-body is provided at the entrance end thereof with a handle or hand-grasp 22, and in addition to this handle or hand-grasp the detachable hood 12 of the trap is also provided with a handle attachment 30. The handle attachment 30 for the hood of the trap essentially consists of a U-shaped handle 31, slidably mounted at the under side of the hood in the slide-loops 32, fitted to the metal bottom panel 17 of the hood, near the small end or apex of the latter. The U-shaped handle 31 is provided with angled terminals 33, forming stops to limit the outward adjustment of the handle, as illustrated in detail, Fig. 5 of the drawings. It will be observed that when the handle 31 is in use the same is slid through the loops 32 to a position entirely beneath the bottom of the hood; but when it is desired to use said handle the same is drawn out to a position beyond the small end of the hood, as plainly shown in Fig. 5 of the drawings, whereby the same may be readily grasped. The said handle 31 affords means for either handling the entire trap or simply the detachable hood, it of course being understood that the handles 22 and 31 are disposed in the most convenient positions for the ready handling of the trap without danger of breaking the fragile panels thereof.

When the trap is in use, the detachable hood 12 is extended beyond one end of the box-body in the position shown in Figs. 1 and 3 of the drawings; but it is the purpose of the present invention to provide for the ready detachment of the hood and also the nesting of the same within the box-body over the entrance-funnel, as shown in Fig. 2 of the drawings, in which latter condition the parts of the trap are assembled together in the smallest possible compass for shipping or transportation. To provide for handling the detachable hood in this manner, the wide end or base thereof is made of a sufficient size so that it will snugly register with the open end of the box-body, while at the same time being capable of sliding therein over the entrance-funnel 7 to the position shown in Fig. 2 of the drawings; but when the parts are assembled for use the base portion of the detachable hood 12 is securely locked within the open end of the box-body in register therewith by means of the oppositely-located spring or equivalent catches 23 and 24, respectively. By releasing these catches it will be readily understood that the detachable hood may be removed for the purpose of baiting the trap or to enable the same to be telescoped or nested within the box-body.

The catch 23 is preferably in the form of a spring-wire and is arranged on the upper side of the box-body and at the open end of the body which receives therein the wide end or base of the hood. The said spring-wire catch 23 is bent in an approximate V shape and has the opposite terminals thereof rigidly secured to the framework of the box-body, thereby leaving the central portion of the wire free to have a spring action, and this central portion of the spring-catch wire 23 is formed with a depending locking-tongue $23^a$, which is adapted to have a locking engagement with the catch-opening $23^b$, formed in the upper side of the skeleton framework of the detachable hood at the wide end or base thereof. The other or lower catch 24 preferably consists of a spring strap or arm secured fast at one end to the metal bottom 17 of the detachable hood 12, and is provided at its opposite free end with a right-angularly disposed locking-tongue $24^a$, adapted to engage in the catch-opening $24^b$, formed in the metal bottom 6 of the main body of the trap.

To provide for a proper registering engagement of the contiguous ends of the trap-body and the detachable hood, the metal framework at these ends is preferably widened, as illustrated in the drawings, and this widening of the framework of the hood at the wide end thereof also facilitates the nesting of such hood within the body.

When it is desired to nest the trap, the upper spring-catch wire 23 is first released from the catch-opening $23^b$ in the hood, and then the latter is tilted, so as to disengage the lower catch 24 from the opening $24^b$ in the bottom of the body, after which the hood may be readily slid within the body. To detach the hood completely from the body, the same operation takes place, excepting that the hood is pulled away from the body after the disengagement of the lower catch 24 therefrom.

In connection with the detachable hood it may be observed at this point that by reason of its tapering form the pressure of the current of water thereon will serve to hold the trap firmly against the bottom of the stream and in a proper position for catching the fish.

Changes in the form, proportion, and the minor details of construction may be resorted to without departing from the principle or sacrificing any of the advantages of this invention.

Having thus described the invention, what is claimed, and desired to be secured by Letters Patent, is—

1. A fish-trap having a body provided with a hood-extension adapted to be nested therein, substantially as set forth.

2. A fish-trap comprising a body provided at one end with an entrance-opening, a separate hood registering with the end of the body opposite the entrance-opening thereof, both said body and the hood being provided with a plurality of transparent panels, and means for detachably fastening the hood to the body, substantially as set forth.

3. In a fish-trap, the body, provided with an inwardly-extending entrance-funnel at one end, and at its opposite end with a hood extension adapted to be nested within the body over the funnel, substantially as set forth.

4. In a fish-trap, the body, provided at one end with an inwardly-disposed entrance-funnel, and at its opposite end with a pyramidal hood, adapted to be nested within the body over the funnel, substantially as set forth.

5. In a fish-trap, a transparent body, provided at one end with an inwardly-disposed transparent entrance-funnel, and at its opposite end with a transparent pyramidal detachable hood adapted to be nested within the body over the funnel, substantially as set forth.

6. A fish-trap, comprising a transparent body having at one end an inwardly-disposed transparent entrance-funnel, and a separate transparent pyramidal hood detachably fitted to the opposite end of the body, substantially as set forth.

7. A fish-trap, comprising a body having at one end an inwardly-disposed entrance-funnel, and at its opposite end a pyramidal detachable hood, said body, and the funnel and hood portions thereof consisting of a skeleton framework of metal strips having grooves in their edges, and transparent panels fitted in the grooved edges of said strips, substantially as set forth.

8. A fish-trap, comprising a transparent body having a metallic bottom plate, and provided at one end with an inwardly-disposed entrance-funnel, and at its opposite end with a pyramidal detachable hood, said hood having a metallic bottom plate, and a perforate closure at its small end, substantially as set forth.

9. A fish-trap, comprising a body provided at one end with an inwardly-disposed entrance-funnel and at its opposite end with a pyramidal detachable hood, said hood being provided at its small end with guides, and a perforate slide-gate working in said guides, substantially as set forth.

10. A fish-trap comprising a body provided at one end with an entrance-opening, and a separate hood registering with and adjustably connected to the end of the body opposite the entrance-opening thereof, both the said body and the hood being provided with a plurality of transparent panels, and with metallic bottom plates, substantially as set forth.

11. A fish-trap comprising a body provided in the bottom thereof with a catch-opening, a separate hood extension detachably registering within one end of the body and also provided with a catch-opening, and spring-catches fitted respectively to the framework of the body and the detachable hood and engaging in said catch-openings, substantially as set forth.

In testimony that I claim the foregoing as my own I have hereto affixed my signature in the presence of two witnesses.

OSCAR P. CLARK.

Witnesses:
W. O. YOUNG,
W. L. MARLEY.